United States Patent [19]

Chang

[11] 4,028,317

[45] June 7, 1977

[54] REMOVAL OF PROTEINS FROM LIQUID ACID CHEESE WHEY

[75] Inventor: Pei K. Chang, Montrose, N.Y.

[73] Assignee: Stauffer Chemical Company, Westport, Conn.

[22] Filed: May 30, 1975

[21] Appl. No.: 582,488

[52] U.S. Cl. .......................................... 260/112 R
[51] Int. Cl.$^2$ ............................................. A23J 1/20
[58] Field of Search .............................. 260/112 R

[56] References Cited

UNITED STATES PATENTS

| | | | |
|---|---|---|---|
| 2,695,235 | 11/1954 | deGoode | 99/57 |
| 3,252,961 | 5/1966 | Rodgers | 260/112 R |
| 3,404,142 | 10/1968 | Shank | 260/112 R |
| 3,583,968 | 6/1971 | Pien | 260/112 R |
| 3,637,643 | 1/1972 | Wingerd | 260/112 R |
| 3,930,039 | 12/1975 | Kuipers | 260/112 R |

OTHER PUBLICATIONS

Chemical Abstracts, vol. 70, No. 56478z, Goujard, 1969.
Chem Abs, vol. 44, No. 7457d, Roeder, 1947.
Chem Abs, vol. 79, No. 52008j, Foremost–McKesson, 1973.
Chem Abs, vol. 49, No. 4204e, de Goede, 1954.
P. Jelen, Journal Dairy Science, vol. 56, No. 12, pp. 1505–1510, 1973.
Smith, Agricultural & Food Chemistry, vol. 10, No. 4, pp. 302–304, 1962.
Putnam, J. American Chemical Society, vol. 66, pp. 692–697, 1944.

*Primary Examiner*—Paul R. Michl
*Attorney, Agent, or Firm*—Richard P. Fennelly

[57] ABSTRACT

Proteins are removed from liquid acid cheese whey at a temperature of from about 10° to about 25° C. by adding to the acid cheese whey, which is at a pH of from about 6.0 to about 8.0, an effective amount of undissolved sodium lauryl sulfate for precipitation of the proteins and by thereafter adjusting the pH of the acid cheese whey to a value of from about 2.0 to about 5.0 to cause said precipitation.

7 Claims, No Drawings

REMOVAL OF PROTEINS FROM LIQUID ACID CHEESE WHEY

TECHNICAL DESCRIPTION OF THE INVENTION

The present invention relates to a process for removal of whey proteins from liquid acid cheese whey by the use of sodium lauryl sulfate as a precipitant for those proteins.

The use of a variety of anionic detergents was described by Smith et al. in Agricultural and Food Chemistry, Vol. 10, No. 4, July – Aug. 1962, pp. 302–304, for use in removing soybean whey proteins from soybean whey. The process described therein utilized an addition of a concentrated solution of the detergent, e.g., sodium lauryl sulfate, to the whey at 25° C. when the both were at a pH of below about 5.0, e.g., at about 4.5. This technique can be used to remove proteins from acid cheese whey over a temperature range of 10°–45° C. if a solution of sodium lauryl sulfate is used and over a temperature range of 25°–45° C. if undissolved or solid sodium lauryl sulfate is used. Addition of undissolved sodium lauryl sulfate, rather than a solution of sodium lauryl sulfate, avoids a volume increase in the acid cheese whey which is to be treated and is preferred for this reason. It has been found, however, that addition of undissolved or solid sodium lauryl sulfate to the acid cheese whey at temperatures of from about 10° to about 25° C. and at the abovedescribed pH values produces incomplete precipitation of protein. Hence, a need has arisen for a new process to accomplish the essentially complete precipitation of whey protein when undissolved sodium lauryl sulfate is to be added to acid cheese whey at temperatures of from about 100° to about 25° C.

The present invention is a process for precipitating proteins from acid cheese whey at temperatures of from about 10° to about 25° C. using undissolved or solid sodium lauryl sulfate as the precipitant. The process comprises adding to the liquid acid cheese whey at a temperature of from about 10° to about 25° C. an effective amount of undissolved sodium lauryl sulfate to later cause precipitation of the protein as a sodium lauryl sulfate-protein complex, said addition being carried out when the cheese whey is at a pH of from about 6.0 to about 8.0, and thereafter adjusting the pH of the whey containing said sodium lauryl sulfate to a value of from about 2.0 to about 5.0 to cause precipitaion of the complex.

Liquid acid cheese whey is a well known product and is a by-product of cheese manufacture. Acid cheese whey, in addition to containing some casein, comprises albumin, globulin, lactose and various salts. The solids content can vary appreciably, but is generally around 6% by weight. Acid cheese wheys include such wheys as cottage and cream wheys and cheese whey obtained by direct acidification of milk.

It is critical to the success of the present invention that the liquid acid cheese whey be at a pH of from about 6.0 to about 8.0 and a temperature of from about 10° to about 25° C. when the undissolved sodium lauryl sulfate is first added. A preferred pH range for addition of the sodium lauryl sulfate to the acid cheese whey is from about 6.5 to about 7, and a preferred temperature is from about 15° to about 25° C. The amount of sodium lauryl sulfate which is added to the liquid acid cheese whey should be from about 0.15% to about 0.40%, preferably about 0.20% to about 0.35%, by weight, based on the volume of liquid cheese whey.

After the sodium lauryl sulfate and liquid cheese whey have been added to one another at the above-described pH and temperature values, the pH of the mixture is then adjusted to those pH values which will give the desired degree of protein precipitation, i.e., from about 2.0 to about 5.0, e.g., from about 3.5 to about 4.0. The same temperatures as described above are maintained during this step. The resulting product which will then precipitate from solution is a whey protein/sodium lauryl sulfate complex which has a protein content of from about 60% to about 70% by weight. The sodium lauryl sulfate and protein are then separated from one another by a number of well known methods including: treatment with barium chloride, e.g., as described in J. Amer. Chem. Soc. 66: 692 (1944); dialysis, e.g., as described in J. Amer. Chem. Soc. 81: 1400 (1959); treatment with acetone, e.g., as described in Ind. Eng. Chem. 36: 372 (1944); or treatment with an anionic exchange resin, e.g., as described in J. Biological Chem. 246: 4504 (1971). This allows for use of the whey protein thereby isolated in foods, by example, as a protein supplement.

The present invention is further illustrated by the following Examples:

EXAMPLE 1

Liquid whey was separated from skim milk by addition of 1N hydrochloric acid to precipitate casein at a pH of about 4.6 The pH of the liquid whey was then adjusted to 6.5 at a temperature of about 20° C. by the addition of 1N sodium hydroxide. Sodium lauryl sulfate was then added to produce various concentrations in the solution. The pH was again adjusted to 4.5 by the addition of acid, and protein precipitation occurred. Table 1 sets forth the results that were obtained:

Table 1

| Sodium Lauryl Sulfate (%)* | Protein Recovered (%)** |
|---|---|
| 0.16 | 89 |
| 0.20 | 93 |
| 0.24 | 95 |
| 0.32 | 94 |
| 0.40 | 95 |

*The % concentration of sodium lauryl sulfate (SLS) in the liquid whey calculated on the weight of SLS divided by the volume of liquid.
**The % is based on the total precipitated by addition of a 15% by weight solution of trichloroacetic acid.

The precipitated protein in each case was separated by an ultracentrifugation at 10,000 rpm form about 30 min. About ninety-five percent total protein nitrogen was recovered from the precipitated protein when the SLS level was between 0.24% and 0.40%. The precipitated product was a whey protein-sodium lauryl sulfate complex and was washed twice with distilled water in approximately 1:10 volume measures and was then freeze dried following pH adjustment to 6.5. The product was a white powder having a protein content of about 60%.

EXAMPLE 2

The same procedure for producing liquid whey, as described in Example 1, was used. The liquid whey at a temperature of about 20° C. was again adjusted to a pH of 6.5 prior to sodium lauryl sulfate addition at 0.24 wt. % based on the volume of liquid whey. A series of such formulations were made, and the pH of each was lowered to different pH levels with the use of acid to determine the best pH values for precipitation of the protein-SLS complex. Table 2 sets forth the results that were obtained:

TABLE 2

| pH level | Protein Recovered (%)* |
|---|---|
| 6.0 | 17 |
| 5.0 | 81 |
| 4.5 | 89 |
| 4.0 | 100 |

*Based on total amount of protein precipitated by addition of 15% by weight solution of trichloroacetic acid.

EXAMPLE 3

This example demonstrates the inferior results obtained if the sodium lauryl sulfate is added to the whey when it is at a pH of about 4.5, as suggested by Smith et al., compared to addition at a pH of about 6.5 followed by adjustment downwardly to below 5.0. The example also shows the importance of maintaining the temperature below about 25° C.

Acid whey at a pH of 4.5 and at the temperature set forth in the table below were treated with undissolved sodium lauryl sulfate (0.24 wt. % based on the volume of liquid whey) and the % protein recovery was noted:

| Temperature, ° C. | pH Adjustment* (pH = 6.5) | % Protein** Recovery | Difference in % of Protein Recovery |
|---|---|---|---|
| 15 | No | 73.2 | 17 |
| 15 | Yes | 90.2 | |
| 25 | No | 86.3 | 7 |
| 25 | Yes | 93.3 | |
| 30 | No | 90.6 | 0.9 |
| 30 | Yes | 89.7 | |

*"Yes" indicates following the pH adjustment for sodium lauryl sulfate addition as described herein. "No" indicates adding the sodium lauryl sulfate to the whey at a pH of 4.5.
** protein that precipitates after standing for four hours at room temperature. 100% is based on the amount precipitated when a 15% by weight solution of trichloroacetic acid is added to the whey.

The foregoing examples are merely illustrative of a number of preferred embodiments of the invention. The appended claims set forth the scope of protection desired.

What is claimed:

1. A process for removing proteins from liquid acid cheese whey which comprises:
   a. adding to liqiud cheese whey at a temperature of about 10° to about 25° C. and at a pH of from about 6.0 to about 8.0 an effective amount of undissolved sodium lauryl sulfate for precipitation of proteins therefrom as a sodium lauryl sulfate-protein complex; and
   b. adjusting the pH of the resulting mixture to from about 2.0 and about 5.0 to accomplish said precipitation.

2. A process as claimed in claim 1 wherein the amount of sodium lauryl sulfate which is added ranges from about 0.15% to 0.40% by weight based on the volume of liquid acid cheese-whey.

3. A process as claimed in claim 2 wherein the amount ranges from about 0.20% to 0.35%.

4. A process as claimed in claim 1 wherein the pH in step (a) ranges from about 6.5 to 7.0.

5. A process as claimed in claim 1 wherein the pH in step (b) is adjusted from about 3.5 to about 4.0.

6. A process as claimed in claim 1 wherein the temperature for the entire process ranges from about 15° to about 25° C.

7. A process as claimed in claim 1 wherein the cheese whey is selected from the group consisting of cottage whey, cream whey, and whey obtained by direct acidification of milk.

* * * * *